(12) United States Patent
Fukawatase

(10) Patent No.: US 8,733,832 B2
(45) Date of Patent: May 27, 2014

(54) VEHICLE SEAT

(75) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/819,099

(22) PCT Filed: Aug. 31, 2011

(86) PCT No.: PCT/IB2011/001995
§ 371 (c)(1),
(2), (4) Date: Feb. 26, 2013

(87) PCT Pub. No.: WO2012/032383
PCT Pub. Date: Mar. 15, 2012

(65) Prior Publication Data
US 2013/0161985 A1    Jun. 27, 2013

(30) Foreign Application Priority Data

Sep. 6, 2010   (JP) .................................. 2010-198970

(51) Int. Cl.
*B60N 2/427*         (2006.01)
(52) U.S. Cl.
USPC ...................................................... 297/216.1
(58) Field of Classification Search
USPC ................... 297/216.1, 216.13; 280/728.3
See application file for complete search history.

(56) References Cited

U.S. PATENT DOCUMENTS

| | | | |
|---|---|---|---|
| 3,531,154 A * | 9/1970 | La Fleche .................... | 296/68.1 |
| 6,142,563 A | 11/2000 | Townsend et al. | |
| 6,244,656 B1 * | 6/2001 | Mueller ................... | 297/216.13 |
| 6,709,053 B1 * | 3/2004 | Humer et al. .............. | 297/216.1 |
| 6,742,838 B1 * | 6/2004 | Swierczewski ........... | 297/216.1 |
| 6,926,358 B2 * | 8/2005 | Fujita et al. .............. | 297/216.14 |
| 7,021,654 B2 * | 4/2006 | Honda et al. ............... | 280/730.2 |
| 7,396,065 B2 * | 7/2008 | Leclerre et al. ............. | 296/68.1 |
| 7,695,064 B2 * | 4/2010 | Thomas et al. .......... | 297/216.16 |
| 7,810,881 B2 * | 10/2010 | Beneker et al. ........... | 297/216.1 |
| 2009/0315373 A1 | 12/2009 | Thomas et al. | |

FOREIGN PATENT DOCUMENTS

| | | |
|---|---|---|
| JP | A 11-129856 | 5/1999 |
| JP | A 11-151963 | 6/1999 |
| JP | A 2002-527280 | 8/2002 |
| JP | A-2007-30583 | 2/2007 |
| JP | A 2007-126029 | 5/2007 |
| JP | A 2007-126030 | 5/2007 |
| JP | A 2009-101739 | 5/2009 |
| JP | A 2010-70080 | 4/2010 |
| WO | WO 00/21783 A1 | 4/2000 |

* cited by examiner

*Primary Examiner* — Sarah B McPartlin
(74) *Attorney, Agent, or Firm* — Oliff PLC

(57) ABSTRACT

An apparatus includes groove-shaped thin portions, of which the length direction is in a vertical direction, that are provided at predetermined intervals in the front-back direction in front of a hip point of a seat side garnish. When an impacting body impacts the seat side garnish and a load is applied to the seat side garnish, first, stress concentrates at the thin portions, and then the area between the thin portion and the thin portion of the seat side garnish, and the area between the thin portion and the thin portion of the seat side garnish deforms so as to move inward in the vehicle width direction. As a result, the seat cushion will readily rise up in front of the hip point, and is thus able to be prevented or suppressed from rising up at the hip point.

6 Claims, 5 Drawing Sheets

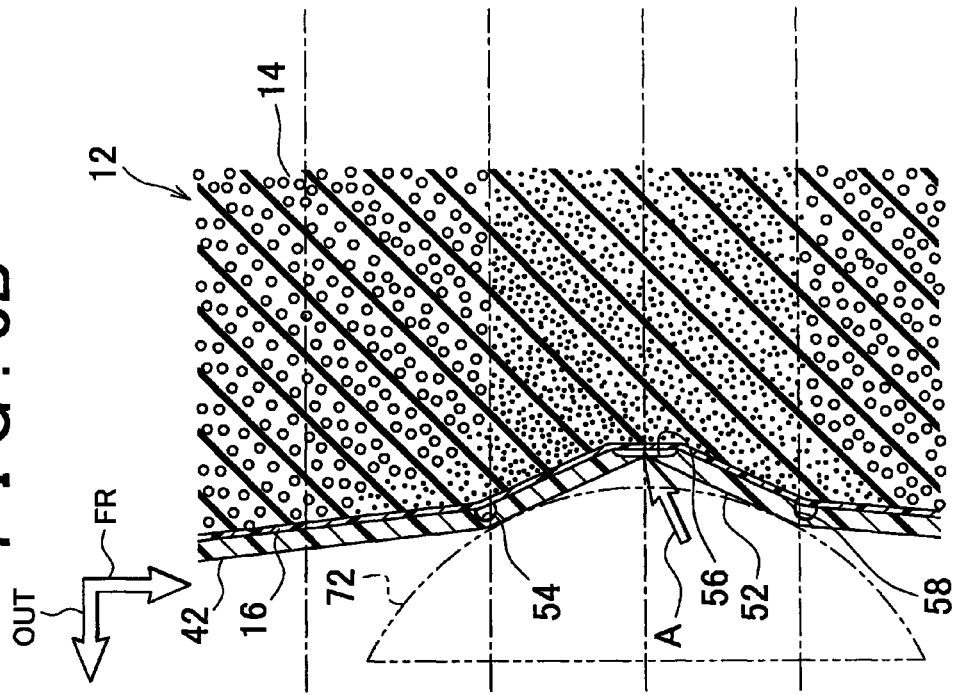
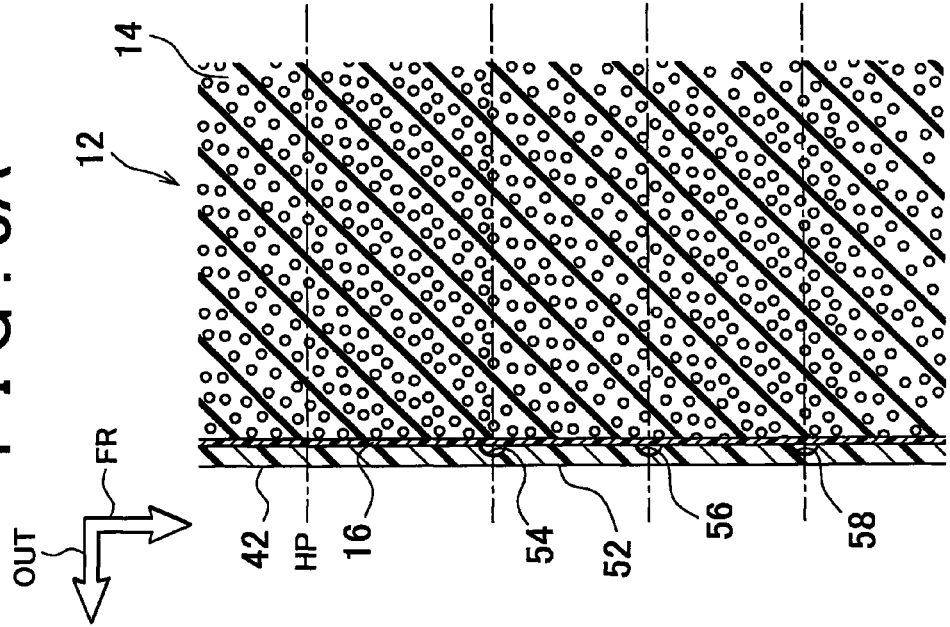

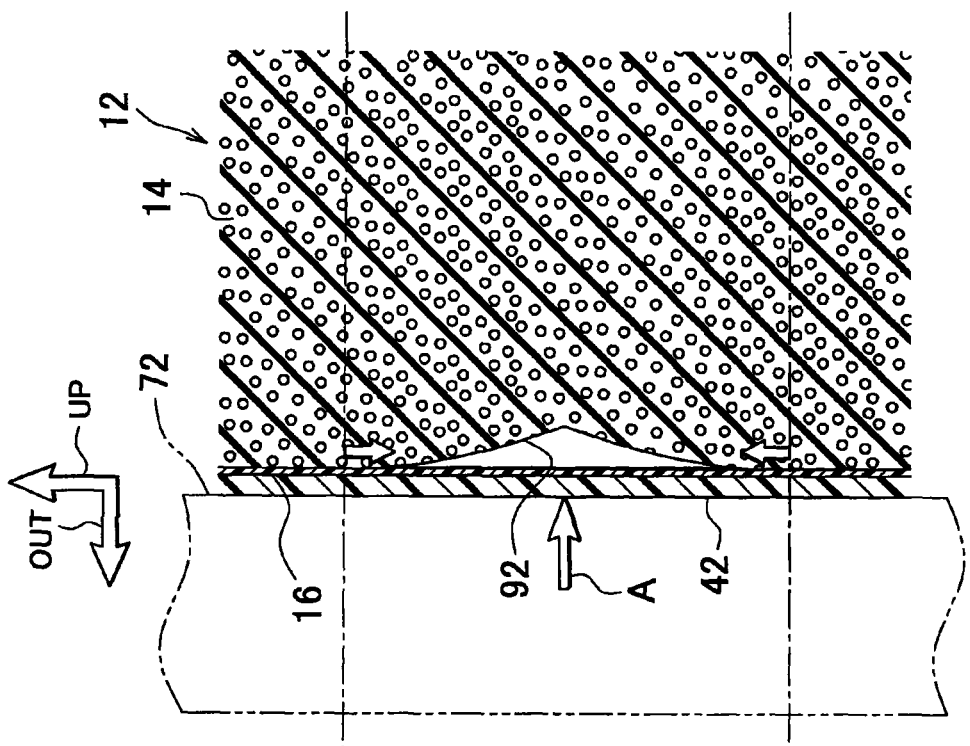
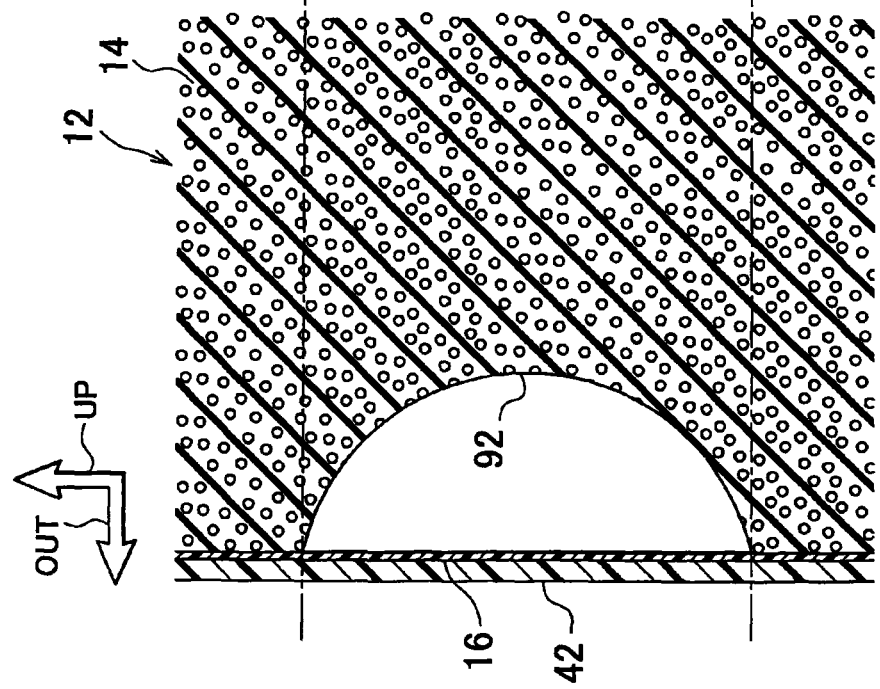

VEHICLE SEAT

This is a National Phase Application of PCT/IB2011/001995 filed Aug. 31, 2011 which claims priority to Japanese Patent Application No. 2010-198970 filed Sep. 6, 2010. The disclosure of each of these applications is being incorporated by reference herein in their entirety.

BACKGROUND OF THE INVENTION

1. Field of the Invention

The invention relates to a vehicle seat of a vehicle provided with a side air bag apparatus.

2. Description of the Related Art

A rear seat of a vehicle described in Japanese Patent Application Publication No. 2010-70080 (JP-A-2010-70080) is provided with a side air bag apparatus housed in an outside end portion of a seat back in the vehicle width direction. When the side air bag apparatus is activated, a bag body of the side air bag apparatus pushes out between the outside end portion of the seat back in the vehicle width direction and a deck trim side, and inflates and deploys while destroying the outside end portion of the seat back in the vehicle width direction and a deck trim side.

One type of a so-called side impact is a pole impact in which a vehicle body largely encroaches into the vehicle cabin at a localized area. When a vehicle body that has been deformed by this kind of a pole impact pushes against a seat side garnish provided along a side end portion of a seat back, cushion material rises up near the outside end portion of the seat cushion in the vehicle width direction and encroaches into the area where a bag body of a side air bag apparatus deploys.

SUMMARY OF THE INVENTION

In view of this, the invention thus provides a vehicle seat capable of suppressing a seat cushion from rising up near the area where a bag body of a side air bag apparatus deploys, or more particularly, near the waist of an occupant, when a seat side garnish deforms.

A first aspect of the invention relates to a vehicle seat in which a bag body of a side air bag apparatus that is provided inside a seat back or inside a side door inflates and deploys along an outside end portion in a vehicle width direction by the side air bag apparatus activating. This vehicle seat includes a seat cushion, a seat side garnish provided along the outside end portion of the seat cushion in the vehicle width direction, and a cushion deformation suppressing device that is provided in a portion of the vehicle seat corresponding to a predetermined portion along the outside end portion of the seat cushion in the vehicle width direction and below the inflated and deployed bag body, and that is configured to suppress deformation of the predetermined portion upward with respect to the vehicle resulting from a load from the outside in the vehicle width direction.

In the vehicle seat described above, the cushion deformation suppressing device may be provided in the seat side garnish. Also, the cushion deformation suppressing device may be provided in the seat cushion.

In the vehicle seat described above, when the vehicle body deforms from a load input from the outside in the vehicle width direction due to a side impact or the like, and this deformed vehicle body pushes the seat side garnish inward in the vehicle width direction, the seat side garnish deforms inward in the vehicle width direction. When the seat side garnish that has deformed in this way pushes the seat cushion inward in the vehicle width direction, the portion near the outside end portion of the seat cushion in the vehicle width direction tries to deform by rising upward with respect to the vehicle.

Here, if the cushion deformation suppressing device is provided in at least a portion of the vehicle seat, for example, in at least one of the seat side garnish and the seat cushion, then even if the seat side garnish deforms as described above, the seat cushion can be suppressed from deforming upward (i.e., rising up) at the predetermined portion. As a result, the seat cushion can be prevented or suppressed from encroaching into the area where the bag body of the side air bag apparatus provided in a seat back or a side door inflates and deploys, thereby enabling the bag body to inflate and deploy appropriately.

Also, in the vehicle seat described above, the cushion deformation suppressing device may be provided in the seat side garnish with a portion in front of a hip point of the seat cushion when viewed from a side as the predetermined portion, and may have a weak portion that has a lower mechanical strength than other portions of the seat side garnish, and the cushion deformation suppressing device may include a deformation promoting portion where deformation resulting from a load from the outside in the vehicle width direction is promoted more than at other portions of the seat side garnish. Here, the weak portion may be formed of a plurality of thin portions.

According to the vehicle seat described above, a portion in front of a hip point of the seat cushion when viewed from the side is provided as the predetermined portion of the seat cushion, and a deformation promoting portion is provided in the seat side garnish corresponding to this predetermined portion. This deformation promoting portion has a weak portion that has a lower mechanical strength than other portions of the seat side garnish, such that when a load from the outside in the vehicle width direction is applied to the seat side garnish, the load concentrates at the weak portion.

Therefore, when external force from the outside in the vehicle width direction is applied to the seat side garnish, deformation toward the inside in the vehicle width direction is promoted at the deformation promoting portion more than at other portions, such that the deformed deformation promoting portion pushes against the seat cushion. However, the load that is applied to the seat side garnish is expended in the deformation of the deformation promoting portion, so deformation toward the inside in the vehicle width direction of a portion other than the deformation promoting portion of the seat side garnish is suppressed. As a result, the pressure on the seat cushion by the seat side garnish is reduced.

Therefore, although the seat cushion that is pressed on by the deformation promoting portion does rise up somewhat, the seat cushion is suppressed from deforming upward (rising up) behind the deformation promoting portion.

Also, in the vehicle seat described above, the cushion deformation suppressing device may be provided in the seat cushion with an area that includes a hip point of the seat cushion when viewed from the side as the predetermined portion, and the cushion deformation suppressing device may include a recessed portion where cushion material that forms the seat cushion is partially absent. Further, the cushion deformation suppressing device may be provided in the seat cushion with an area that includes a hip point of the seat cushion when viewed from the side as the predetermined portion, and the cushion deformation suppressing device may include a hollow portion where cushion material that forms the seat cushion is partially absent. Moreover, the cushion deformation suppressing device may be provided in the seat cushion with an area that includes a hip point of the seat cushion when viewed from the side as the predetermined portion, and the cushion deformation suppressing device may include a cushion low density portion where an expansion ratio of the cushion material is higher than at other portions.

According to the vehicle seat described above, the area that includes the hip point of the seat cushion is provided as the predetermined portion of the seat cushion, and a recessed portion or a hollow portion, or a cushion low density portion is provided at this predetermined portion. The recessed portion or the hollow portion is a portion where the cushion material is absent (i.e., the cushion is intentionally not provided), and the cushion low density portion is a portion where the density of the cushion material is made lower than at other portions by setting the expansion ratio of the cushion material higher than at other portions.

When the seat side garnish deforms inward in the vehicle width direction by a load from the outside in the vehicle width direction, and as a result, the seat side garnish presses on the area that includes the predetermined portion of the seat cushion, if the cushion deformation suppressing device is the recessed portion or the hollow portion, the seat cushion deforms such that the cushion material of the seat cushion fills in the recessed portion or the hollow portion, and if the cushion deformation suppressing device includes the cushion low density portion, the seat cushion deforms so as to increase the density of the cushion material at the cushion low density portion. Having the seat cushion deform in this manner by the deformation of the seat side garnish makes it possible to suppress the area that includes the hip point of the seat cushion from deforming upwards (i.e., makes it possible to suppress the predetermined portion of the seat cushion from rising up).

As described above, the vehicle seat is able to prevent or suppress the seat cushion from encroaching into the area near the waist of an occupant where the bag body of the side air bag apparatus inflates and deploys, due to deformation of the seat side garnish.

Also, with the vehicle seat described above, the seat cushion readily rises upward in front of the hip point from deformation of the seat side garnish, so the seat cushion can be suppressed from rising upward at the hip point.

Furthermore, with the vehicle seat described above, deformation that increases the density of the seat cushion occurs at the recessed portion or the hollow portion or the cushion low density portion provided in the area that includes the hip point, due to deformation of the seat side garnish. As a result, the seat cushion is suppressed from rising upward at the area that includes the hip point of the seat cushion.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3A is an enlarged planar sectional view schematically showing a main portion of the vehicle seat according to the first example embodiment, before impact with an impacting body;

FIG. 3B is an enlarged planar sectional view schematically showing a main portion of the vehicle seat according to the first example embodiment, on impact with an impacting body;

FIG. 5A is an enlarged planar sectional view schematically showing a main portion of the vehicle seat according to the second example embodiment, before impact with an impacting body; and FIG. 5B is an enlarged planar sectional view schematically showing a main portion of the vehicle seat according to the second example embodiment, on impact with an impacting body.

DETAILED DESCRIPTION OF EMBODIMENTS

Figure 1:
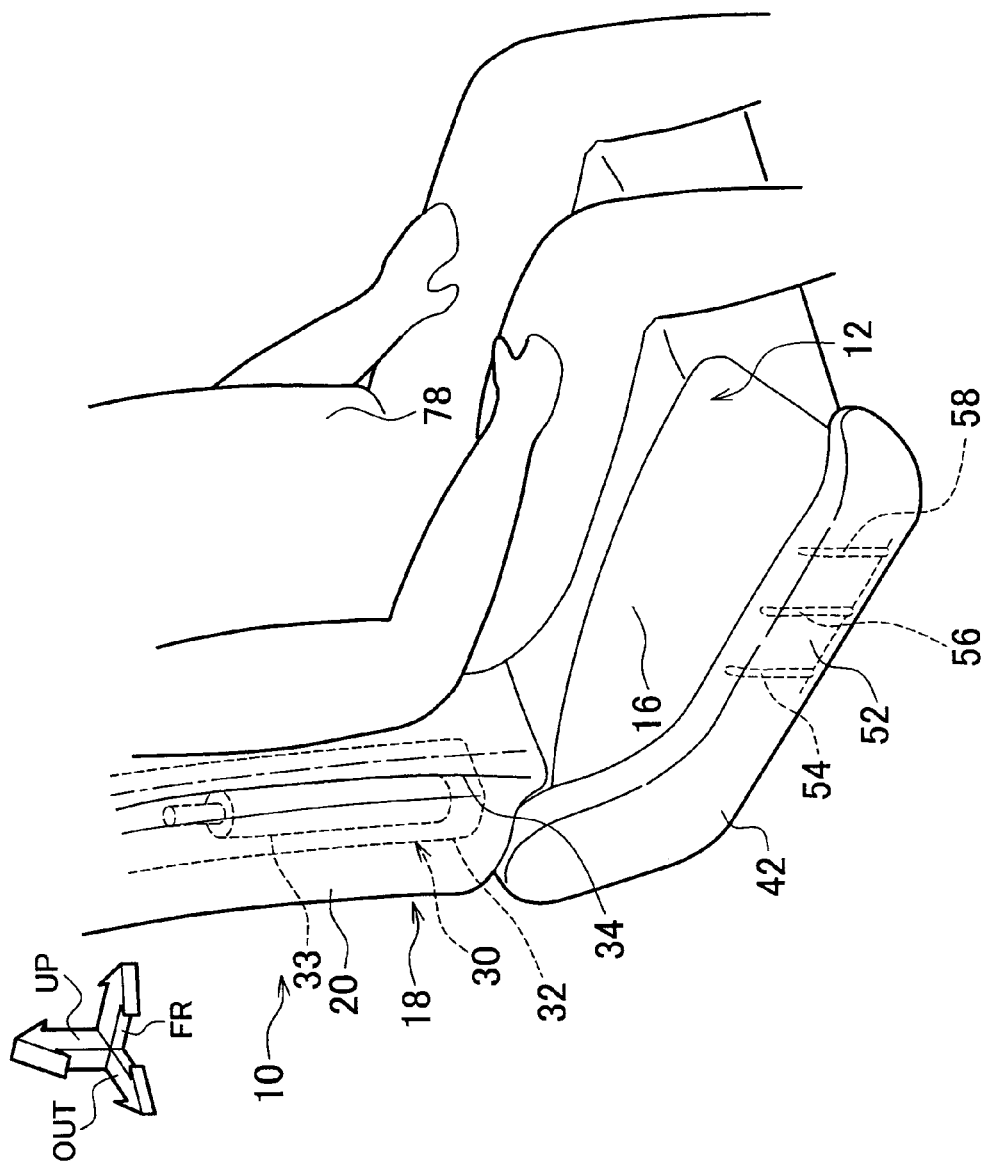
FIG. 1 is a perspective view schematically showing the structure of a vehicle seat according to a first example embodiment of the invention.

Next, various example embodiments of the invention will be described with reference to FIGS. 1 to 5A and 5B. In the drawings, the FR arrow indicates the direction toward the front of a vehicle to which the corresponding example embodiment is applied, the arrow UP indicates the upward direction with respect to a vehicle to which the corresponding example embodiment is applied, and the OUT arrow indicates the direction to the outside of a vehicle to which the corresponding example embodiment is applied. Also, in the description of the example embodiments below, portions in an example embodiment being described that are basically the same as portions in an example embodiment described earlier will be denoted by the same reference numerals and detailed descriptions of those portions will be omitted.

FIG. 1 is a perspective view schematically showing the structure of a rear seat 10 as a vehicle seat according to a first example embodiment of the invention.

As shown in the drawings, the rear seat 10 includes a seat cushion 12. The seat cushion 12 includes cushion material 14, as shown in FIGS. 3A and 3B. The cushion material 14 is formed by molding synthetic resin material such as urethane, for example, and is covered by a cover 16. A frame, not shown, is provided on the underside of the seat cushion 12. The seat cushion 12 is fixed to a floor portion that forms the vehicle body, while being supported by the frame.

Meanwhile, as shown by FIG. 1, a seat back 18 is provided on the rear end side of the seat cushion 12. This seat back 18 also includes cushion material, not shown, that is made of synthetic resin material such as urethane and is covered by a cover 20, just like the seat cushion 12. The lower end portion of the seat back 18 is fixed to the frame that supports the seat cushion 12.

Also, a side air bag apparatus 30 is provided inside the seat back 18 at an outer end of the seat back 18 in the vehicle width direction. The side air bag apparatus 30 includes a bag body 32. This bag body 32 is housed folded up inside the seat back 18. When an inflator 33 that serves as a gas supply device that is provided inside the bag body 32 activates such that gas is supplied into the bag body 32, the bag body 32 inflates from the gas pressure.

Figure 2:
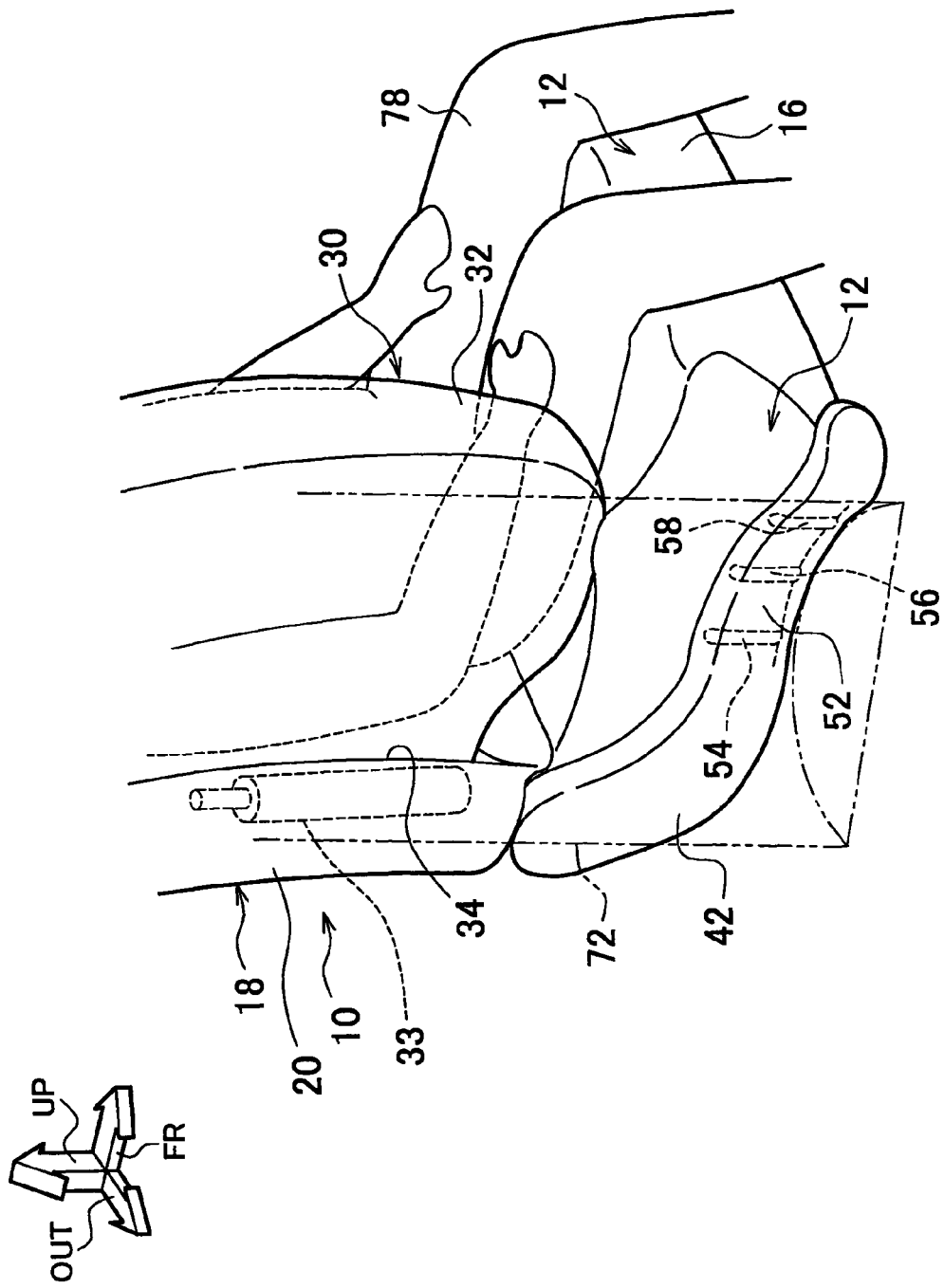
FIG. 2 is a perspective view corresponding to FIG. 1, of a side air bag apparatus in an activated state, in the vehicle seat according to the first example embodiment.

The inflated bag body 32 pushes against an area near a seam 34 of a front surface and a side surface of the cover 20 of the seat back 18, consequently tearing the seam 34. When the seam 34 opens as a result, the bag body 32 inflates and deploys in front of the seat back 18, at the area near the outside end of the seat back 18 in the vehicle width direction, as shown in FIG. 2.

Meanwhile, the rear seat 10 includes a seat side garnish 42 on the outside of the seat cushion 12 in the vehicle width direction. This seat side garnish 42 is formed in a sheet shape in which the direction of thickness is generally the vehicle width direction, by the synthetic resin, and is provided on the side, in the vehicle width direction, of the frame that supports the seat back 18 from below. The upper end side of the seat side garnish 42 extends to the side of the seat cushion 12 and hides the lower end side of the seat cushion 12 as well as the frame.

Also, a deformation promoting portion 52, that is one example of a cushion deformation suppressing device, is provided in the seat side garnish 42. The deformation promoting portion 52 includes a thin portion 54 that serves as a weak portion. The thin portion 54 is a groove in which the length direction runs in the vertical direction, and is formed farther forward than a hip point HP of the seat cushion 12. This thin portion 54 is thinner than other portions of the seat side garnish 42.

A thin portion 56 that serves as a weak portion is formed farther forward than the thin portion 54 in the seat side garnish 42, and a thin portion 58 that serves as a weak portion is formed farther forward than the thin portion 56 in the seat side garnish 42. These thin portions 56 and 58 are grooves in which the length directions run in the vertical direction farther forward than the hip point HP (i.e., the position of the alternate long and short dash line HP in FIGS. 3A and 3B). The thin portions 56 and 58 are thinner than other areas of the seat side garnish 42.

In this way, the thin portions 54, 56, and 58 are thinner than other portions of the seat side garnish 42, so the mechanical strength is lower at these portions than it is at other portions of the seat side garnish 42. Thus, if a load from the outside in the vehicle width direction is applied to the seat side garnish 42, for example, stress will concentrate at these thin portions 54, 56, and 58.

Next, the operation and effects of this first example embodiment will be described.

In a pole impact that is one type of side impact of a vehicle, a door or the like of the vehicle deforms locally, and as a result, encroaches into the cabin of the vehicle, pushing against the seat side garnish 42. Envisioning such a pole impact, an impacting body 72 that has a shorter longitudinal dimension than the rear seat 10 impacts the seat side garnish 42 from direction A (i.e., the direction of arrow A in FIG. 3B) that is slanted toward the front of the vehicle at a predetermined angle with respect to the outside in the vehicle width direction. When a load is applied to the seat side garnish 42 as a result of the impacting body 72 impacting the seat side garnish 42 in this way, the seat side garnish 42 bends inward in the vehicle width direction.

Here, with this rear seat 10, the deformation promoting portion 52 is provided in the seat side garnish 42, so when the load is applied to the seat side garnish 42 in this way, the stress concentrates at the thin portions 54, 56, and 58 of the deformation promoting portion 52. Therefore, when the load is applied to the seat side garnish 42, the seat side garnish 42 first deforms at the thin portions 54, 56, and 58, and a portion of the deformation promoting portion 52 (i.e., the seat side garnish 42) that is on the thin portion 56 side of the thin portion 54 bends to the inside in the vehicle width direction around the thin portion 54, and a portion of the deformation promoting portion 52 (i.e., the seat side garnish 42) that is on the thin portion 56 side of the thin portion 58 bends to the inside in the vehicle width direction around the thin portion 58.

As a result, when the load is applied to the seat side garnish 42, the portion between the thin portion 54 and the thin portion 58 moves farthest to the inside in the vehicle width direction and pushes the cushion material 14 toward the inside in the vehicle width direction via the cover 16. Accordingly, the cushion material 14 greatly deforms between the thin portion 54 and the thin portion 58, such that the seat cushion 12 rises upward as shown in FIG. 2.

Regarding this, most of the load that is applied to the seat side garnish 42 is expended in the deformation of the deformation promoting portion 52, so there is not much deformation of the seat side garnish 42 at portions other than the deformation promoting portion 52. Therefore, the seat cushion 12 rises only slightly, if at all, behind the thin portion 54 and in front of the thin portion 58.

Here, the thin portion 54 (i.e., the deformation promoting portion 52) is provided in front of the hip point of the seat cushion 12, as shown in FIGS. 3A and 3B, so the seat cushion 12 readily rises up between the thin portion 54 and the thin portion 58, and thus able to be suppressed from rising up near the hip point that is behind the thin portion 54 (i.e., the deformation promoting portion 52).

Accordingly, neither the cushion material 14 nor the seat side garnish 42 will accidentally encroach into the area where the bag body 32 inflates and deploys near the hip point described above. Also, the waist of an occupant 78 seated in the rear seat 10 is able to be prevented or suppressed from accidentally rising, thus improving the ability of the bag body 32 that has inflated and deployed in front of the seat back 18 and near the outside end portion of the seat back 18 in the vehicle width direction to protect the waist of the occupant 78, as shown in FIG. 2.

Next, a second example embodiment of the invention will be described.

Figure 4:
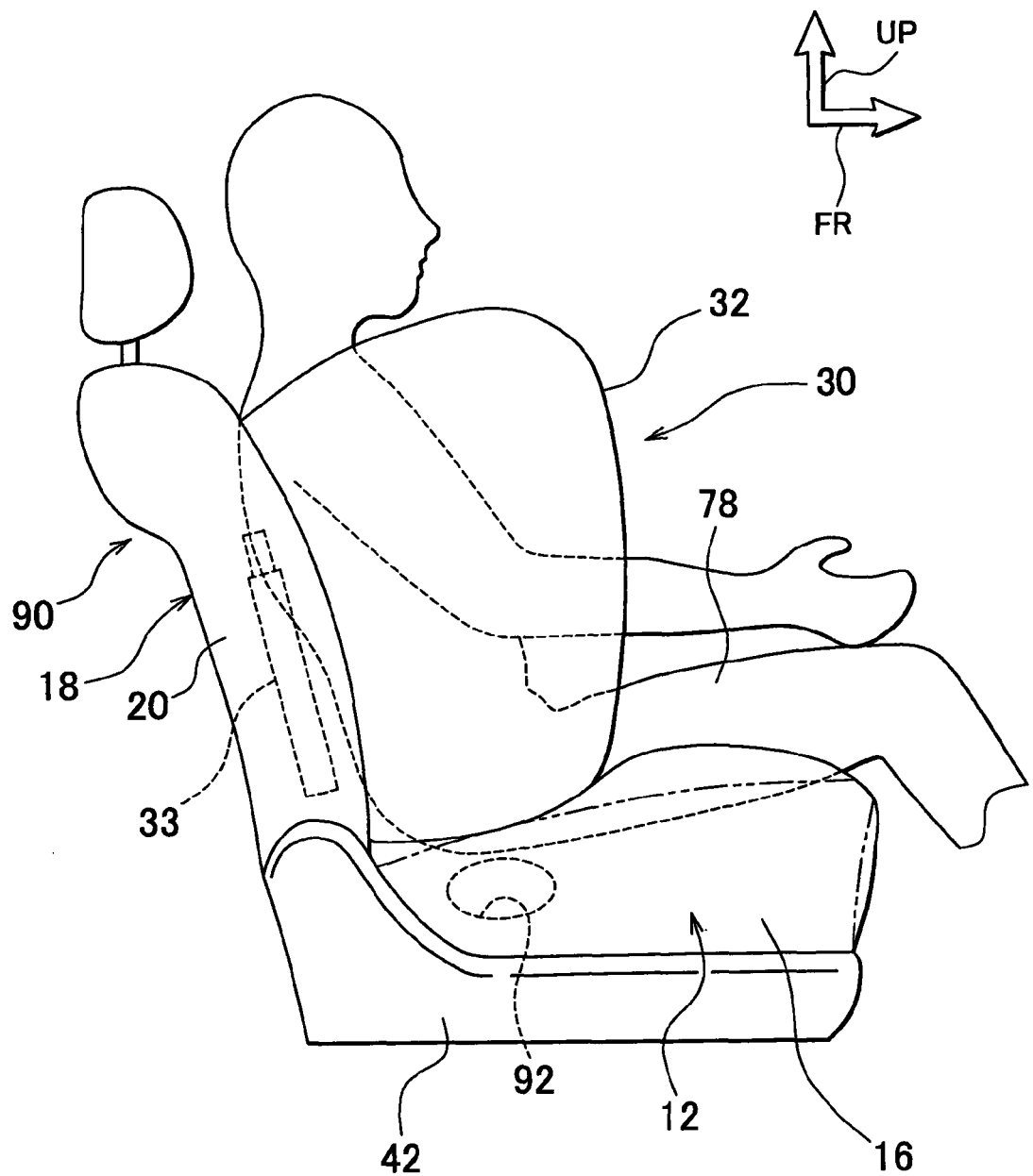
FIG. 4 is a side view schematically showing the structure of a vehicle seat according to a second aspect of the invention.

FIG. 4 is a side view schematically showing the structure of a rear seat 90 as a vehicle seat according to the second example embodiment (i.e., a side view of the bag body 32 in an inflated and deployed state). Also, FIGS. 5A and 5B are enlarged planar sectional views schematically showing a main portion of the rear seat 90.

As shown in these drawings, the rear seat 90 is such that a single recessed portion 92 that is one example of the cushion deformation suppressing device is formed in the cushion material 14 of the seat cushion 12. The recessed portion 92 is in a portion of the cushion material 14 where the cushion material 14 is partially absent (in other words, the recessed portion 92 is a hole open at the outside end portion of the cushion material 14 in the vehicle width direction). This recessed portion 92 is formed at and around the hip point (i.e., in an area that includes the hip point) of the seat cushion 12. Also, with this rear seat 90, the deformation promoting portion 52 that includes the thin portions 54, 56, and 58 is not provided in the seat side garnish 42. However, the deformation promoting portion 52 may be provided in the seat side garnish 42 so as to face the recessed portion 92 in the vehicle width direction.

With the rear seat 90 structured as described above, the cushion material 14 will deform when the seat side garnish 42 bends inward in the vehicle width direction by a load applied from an impacting body 72, and as a result, the cushion material 14 of the seat cushion 12 is pushed on. However, because there is no cushion material 14 at the portion where the recessed portion 92 is provided, the cushion material 14 is able to easily move into the recessed portion 92.

Accordingly, when the cushion material 14 is pushed on from the outside in the vehicle width direction as described above, the cushion material 14 will deform into the recessed portion 92 so as to fill in the recessed portion 92, in response to a load from the outside in the vehicle width direction around the recessed portion 92 and a load from the occupant 78 seated on the seat cushion 12, as shown in FIG. 5B. This kind of deformation occurs in the cushion material 14 at the hip point and the area there around, so the cushion material 14 is prevented or suppressed from deforming upward, i.e., the cushion material 14 is prevented or suppressed from rising up.

As a result, neither the cushion material 14 nor the seat side garnish 42 will accidentally encroach into the area where the bag body 32 inflates and deploys near the hip point. Also, the waist of the occupant 78 seated in the rear seat 90 is able to be prevented or suppressed from accidentally rising up, so the ability of the bag body 32 that has inflated and deployed in front of the seat back 18 and near the outside end portion of the seat back 18 in the vehicle width direction to protect the waist of the occupant 78 can be improved.

In this example embodiment, only one recessed portion 92 is formed in the cushion material 14. Alternatively, however, a plurality of recessed portions 92 of either the same shape or different shapes may be formed in the cushion material 14.

Also, in this example embodiment, the recessed portion 92 that is open at the outside end portion of the cushion material 14 of the seat cushion 12 in the vehicle width direction is given as an example of the cushion deformation suppressing device. However, a hollow portion formed in an area that includes the hip point and that is near the outside end portion of the cushion material 14 in the vehicle width direction may be used, instead of this kind of recessed portion 92, as the cushion deformation suppressing device.

Moreover, in this example embodiment, the recessed portion 92 and the hollow portion described above are formed in the cushion material 14, and the cushion material 14 is configured so as to be able to deform toward the inside of the recessed portion 92 and the hollow portion. However, the recessed portion 92 and the hollow portion may also be omitted as long as the amount of deformation of the cushion material 14 due to the load from the outside in the vehicle width direction is able to be absorbed by the inside of the seat cushion 12.

For example, instead of the recessed portion 92 and the hollow portion, a cushion low density portion where the expansion ratio of the cushion material 14 is high and the density of the cushion material 14 is low may be formed in an area that includes the hip point of the cushion material 14 of the seat cushion 12. At this kind of cushion low density portion, the density of the cushion material 14 is low, so the cushion material 14 around the cushion low density portion will deform so as to move to the cushion low density portion side in response to a load from the outside in the vehicle width direction and a load from the occupant 78 seated on the seat cushion 12. As a result, the cushion material 14 at and around the hip point is able to be prevented or suppressed from rising up.

Also, in all of the example embodiments described above, the side air bag apparatus 30 is provided inside the seat back 18. Alternatively, however, the side air bag apparatus 30 may be provided in a side door next to the rear seat 10.

Furthermore, in the example embodiments described above, the invention is applied to the rear seat 10 and 90 of a vehicle. However, the invention may also be applied to a seat other than a rear seat, such as a front seat, e.g., a driver's seat or a front passenger's seat, of a vehicle.

The invention claimed is:

1. A vehicle seat comprising:
   a seat cushion having an outside end portion in a vehicle width direction, a bag body of a side air bag apparatus inflating and deploying along the outside end portion in the vehicle width direction by the side air bag apparatus activating, the side air bag apparatus being provided inside a seat back or inside a side door;
   a seat side garnish provided along the outside end portion of the seat cushion in the vehicle width direction; and
   a cushion deformation suppressing device provided in a portion of the seat side garnish, the portion of the seat side garnish being in front of a hip point of the seat cushion when viewed from a side, the cushion deformation suppressing device having a weak portion having a lower mechanical strength than other portions of the seat side garnish, the cushion deformation suppressing device being configured to include a deformation promoting portion where deformation resulting from a load from an outside in the vehicle width direction is promoted more than at other portions of the seat side garnish, and the cushion deformation suppressing device suppresses deformation of the seat cushion at the hip point upward with respect to a vehicle resulting from the load.

2. The vehicle seat according to claim 1, wherein the weak portion is formed of a plurality of thin portions.

3. A vehicle seat comprising:
   a seat cushion having an outside end portion in a vehicle width direction, a bag body of a side air bag apparatus inflating and deploying along the outside end portion in the vehicle width direction by the side air bag apparatus activating, the side air bag apparatus being provided inside a seat back or inside a side door;
   a seat side garnish provided along the outside end portion of the seat cushion in the vehicle width direction; and
   a cushion deformation suppressing device provided in the seat at an area including a hip point of the seat cushion when viewed from a side, the cushion deformation suppressing device being configured to include a recessed portion or a hollow portion where cushion material forming the seat cushion is partially absent, or a cushion low density portion where an expansion ratio of the cushion material is higher than at other portions, and the cushion deformation suppressing device suppressing deformation of the seat cushion at the hip point upward with respect to a vehicle resulting from a load from an outside in the vehicle width direction.

4. The vehicle seat according to claim 3, wherein the cushion deformation suppressing device includes the recessed portion.

5. The vehicle seat according to claim 3, wherein the cushion deformation suppressing device includes the hollow portion.

6. The vehicle seat according to claim 3, wherein the cushion deformation suppressing device includes the cushion low density portion.

* * * * *